United States Patent
Lee et al.

(10) Patent No.: US 6,567,774 B1
(45) Date of Patent: *May 20, 2003

(54) METHOD AND SYSTEM FOR CONFIGURING AND UPDATING NETWORKED CLIENT STATIONS USING A VIRTUAL DISK AND A SNAPSHOT DISK

(75) Inventors: Edward K. Lee, Palo Alto, CA (US); Chandramohan A. Thekkath, Palo Alto, CA (US)

(73) Assignee: Compaq Computer Corporation, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/016,315

(22) Filed: Jan. 30, 1998

(51) Int. Cl.[7] .............. G06F 9/455; G06F 9/00; G06F 15/167; G06F 12/00; G06F 9/44

(52) U.S. Cl. ...................................... 703/23

(58) Field of Search .................. 395/712; 713/100, 713/1, 2; 717/11, 168, 169, 170, 171, 172, 173, 174, 176–178; 709/220, 221, 222, 214, 215, 216, 219, 250, 217, 227; 714/13, 4, 6; 711/161, 203, 162

(56) References Cited

U.S. PATENT DOCUMENTS

| | | | |
|---|---|---|---|
| 4,885,770 A | | 12/1989 | Croll .............................. 713/2 |
| 4,994,963 A | * | 2/1991 | Rorden et al. ............... 709/213 |
| 5,142,680 A | * | 8/1992 | Ottman et al. ............... 709/217 |
| 5,146,568 A | * | 9/1992 | Flaherty et al. ............... 703/24 |
| 5,210,866 A | * | 5/1993 | Milligan et al. ............... 714/6 |

(List continued on next page.)

OTHER PUBLICATIONS

"DECnet/OSI Version 6.1 for Open VMS AXP SPD 50.45.05," Feb. (1995) pp. 1–24.
"DECnet Phase IV Digital Network Architecture (DNA)," Jun. (1999) pp. 28–1 through 28–10 Chptr. 28.
"DECnet Digital Network Architecture Maintenance Operations Functional Specification Version 3.0.0," Sep. (1983) pp. 1–93.
"DECnet Digital Network Architecture Network Management Functional Specification Version 4.0.0," Jul. (1983) pp. 1–207.
Pei Cao et al,The Ticker TAIP Parrallel RAID Architecture: ACM Transactions on Computer Systems, vol. 12, No. 3, Aug. 1994, pp. 236–269.
John Wilkes et al,The HP AutoRAID hierarchical storage system: ACM Transactions on Computer Systems, vol. 14, No. 1, Feb. 1996, pp. 1–29.
Robert M. English et al, Loge: a self–organizing disk controller: USENIX Winter 1992 Technical Conference, Jan. 20–24,1992, pp. 237–251.
Chia Chao et al, Mime: a high performance parallel storage device with strong recovery guarantees: Mar. 18, 1992, revised Nov. 6, 1992.
Edward K. Lee, et al., Petal: Distributed Virtual Disks.

(List continued on next page.)

Primary Examiner—Hugh Jones
Assistant Examiner—W. Thomson
(74) Attorney, Agent, or Firm—Oppenheimer Wolff & Donnelly, LLP

(57) ABSTRACT

A system and method for facilitating configuration of client stations in a computer network. A virtual disk representing configuration information is formed and selectively exported via the network to the client stations. The stations are configured with the configuration information identified by the virtual disk. Snapshot disks representing modifications to the configuration information required at the client stations can also be created, transported across the computer network, and used to upgrade client station.

22 Claims, 5 Drawing Sheets

U.S. PATENT DOCUMENTS

| | | | | |
|---|---|---|---|---|
| 5,359,730 A | * | 10/1994 | Marron | 713/100 |
| 5,403,639 A | * | 4/1995 | Belsan et al. | 707/204 |
| 5,421,009 A | * | 5/1995 | Platt | 709/221 |
| 5,452,454 A | * | 9/1995 | Basu | 713/2 |
| 5,475,819 A | | 12/1995 | Miller et al. | 709/203 |
| 5,604,906 A | * | 2/1997 | Murphy et al. | 717/162 |
| 5,606,681 A | * | 2/1997 | Smith et al. | 711/100 |
| 5,634,096 A | * | 5/1997 | Baylor et al. | 714/15 |
| 5,675,800 A | | 10/1997 | Fisher, Jr. et al. | 379/269 |
| 5,771,354 A | * | 6/1998 | Crawford | 707/204 |
| 5,842,011 A | * | 11/1998 | Basu | 713/2 |
| 5,881,311 A | * | 3/1999 | Woods | 710/3 |
| 5,887,164 A | * | 3/1999 | Gupta | 713/100 |
| 5,909,540 A | * | 6/1999 | Carter et al. | 714/4 |
| 5,909,689 A | * | 6/1999 | Van Ryzin | 707/203 |
| 5,948,062 A | * | 9/1999 | Tzelnic et al. | 707/10 |
| 5,974,258 A | * | 10/1999 | Ferri et al. | 709/221 |
| 5,974,547 A | * | 10/1999 | Klimenko | 713/2 |
| 6,061,770 A | * | 5/2000 | Franklin | 711/161 |
| 6,092,189 A | * | 7/2000 | Fisher et al. | 713/1 |
| 6,098,158 A | * | 8/2000 | Lay et al. | 711/161 |
| 6,148,377 A | * | 11/2000 | Carter et al. | 711/100 |

OTHER PUBLICATIONS

Chanramohan A. Thekkath et al, Frangipani: A Scalable Distributed File System.

Edward K. Lee, Highly–Available, Scalable Network Storage.

Wiebren de Jonge, The Logical Disk: A New Approach to Improving File Systems.

John H. Hartman et al, The Zebra Stripe Network File Ssytem.

Leslie Lamport, The Part–Time Parliament, Sep. 1, 1989.

* cited by examiner

METHOD AND SYSTEM FOR CONFIGURING AND UPDATING NETWORKED CLIENT STATIONS USING A VIRTUAL DISK AND A SNAPSHOT DISK

FIELD OF THE INVENTION

The present invention relates generally to the configuration and management of computer stations, and more particularly, to configuring computer stations linked together by a computer network.

BACKGROUND

For a networked computer station to be operable, it must first be configured with configuration information. The configuration information includes, for instance, the computer operating system. Conventionally, such information is installed on a computer using a master configuration disk. The master configuration disk is physically carried to the computer station which is to be configured. Once delivered, the master configuration disk is installed in a disk reader, such as a floppy disk drive, and copied into the memory of the computer station. The master configuration disk is then removed from the disk reader and typically stored at a central location. Additional computer stations can similarly be configured with the master configuration disk.

When a computer network is formed, it is often desirable that all of the computer stations within the network initially have the same configuration information installed. When the network is formed of a large number of computer stations, installing the configuration information at each of the computer stations can become a time-consuming and tedious process. For example, the master configuration disk must be provided to each of the computer stations by physically transporting the master configuration disk to each station. Once provided to each of the computer stations, the configuration information must be read into the local memories of each station. Additionally, updating each of the computer stations with upgraded configuration information requires the same time-consuming and tedious process.

To avoid the above process, the configuration information, as well as updates thereto, could be provided to the computer stations by way of network connections. However, if different configuration information is required at different computer stations ensuring that the correct configuration information is provided to the computer stations becomes burdensome. Thus, conventional techniques for installing and updating configuration information via the network is, in many cases, considered impractical.

Accordingly, it is desirable to provide an improved technique by which to more easily configure and maintain computer stations connected to form a computer network.

The details of such technique and additional advantages and features will be described below.

SUMMARY OF THE INVENTION

In accordance with the present invention, an improved technique is provided for configuring networked client stations with configuration information.

One or more main storage devices are connected with the client stations via the network. The configuration information necessary for the operation of the client stations is stored on the main storage device(s). The main storage device(s) could be, for example, one or more hard disks, or optical disks which form part of a network server(s).

The configuration information stored on the main storage device(s) is made available to the client stations using one or more virtual disks that include a representation, e.g., main storage device address identifiers, of the applicable configuration information, e.g., master configuration information. Each client station is capable of receiving identifiers of the appropriate configuration information from the virtual disk(s). Each of the virtual disk(s) is preferably a copy-on-write logical disk.

Each of the client stations typically has a local storage device, such as the hard disk of a personal computer (PC). A representation of a first virtual disk can be stored on the local storage device and accessed by a local processor. For example, the representation in the local storage is accessible by a PC processors to provide to the client station identifiers of the first configuration information, e.g., a master configuration.

A second virtual disk may include a representation of second configuration information, e.g., another master configuration or a modification, e.g., upgrade, to the master configuration represented by an identifier on the first virtual disk. A representation of the second virtual disk can be stored at the local storage device. It can be accessed by the local processor to provide an identifier of the second configuration information to another client station, making it possible to provide each client station with a choice of configurations. For example, a first client could choose a configuration including software A, B, and C while a second client could choose a configuration including only A and B.

In practice, the representation of a master configuration is formed, e.g., copied on a virtual disk. A logical copy of the virtual disk is used to create a snapshot of that virtual disk, using, for example, copy-on-write techniques. The snapshot forms the second virtual disk which represents only modifications to the virtual which it is associated. To upgrade a client station, instead of exporting a modified first virtual disk to a client station, only the snapshot is exported. This allows a client station to alter its configuration information by substituting only the snapshot. In this fashion, the identifiers stored on the first virtual disk are not altered. Accordingly, the first virtual disk can be used to provide numerous client stations with identical master configuration information, and the second virtual disks can be used to provide applicable client stations with modifications to the master configuration information.

DETAILED DESCRIPTION OF PREFERRED EMBODIMENT

Figure 1:
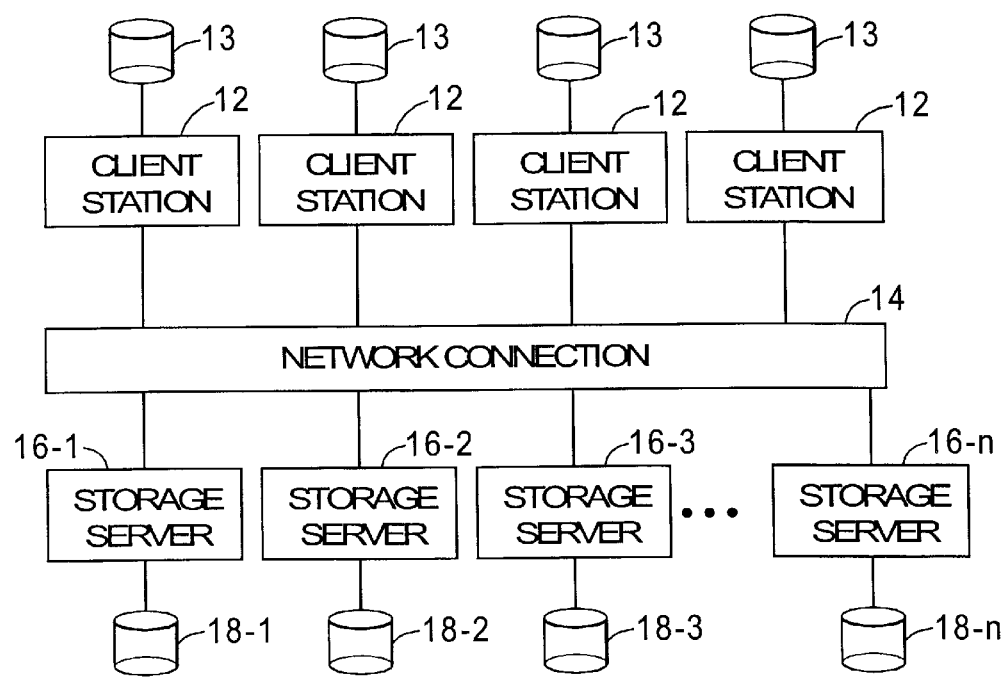
FIG. 1 illustrates a computer network.formed of a plurality of client stations connected by way of network connections to a plurality of network servers, in accordance with the present invention.

Referring first to FIG. 1, a computer network, shown generally at 10, includes a plurality of client stations 12 connected together by way of network connections 14. The client stations 12 may, for example, include personal computers or work stations. The client stations each include local memories 13, such as a hard disk or other memory device.

The network connections 14 that connect together the client stations 12 are scalable, permitting the addition of client stations 12 to the network 10. The network connections 14 may be effectuated, for instance, by way of an ETHERNET, LAN WAN, Internet, or the like.

The computer network 10 further includes a plurality of network storage servers 16, here represented by 16-1, 16-2, 16-3, . . . 16-n. Each of the storage servers 16 is coupled by way of the network connections. 14. Further, each of the storage servers 16 includes storage disks 18, here indicated by storage disks 18-1, 18-2, 18-3, . . . 18-n. Because of the network connections, information stored at the storage disks 18 is accessible by the client stations 12.

Figure 2:
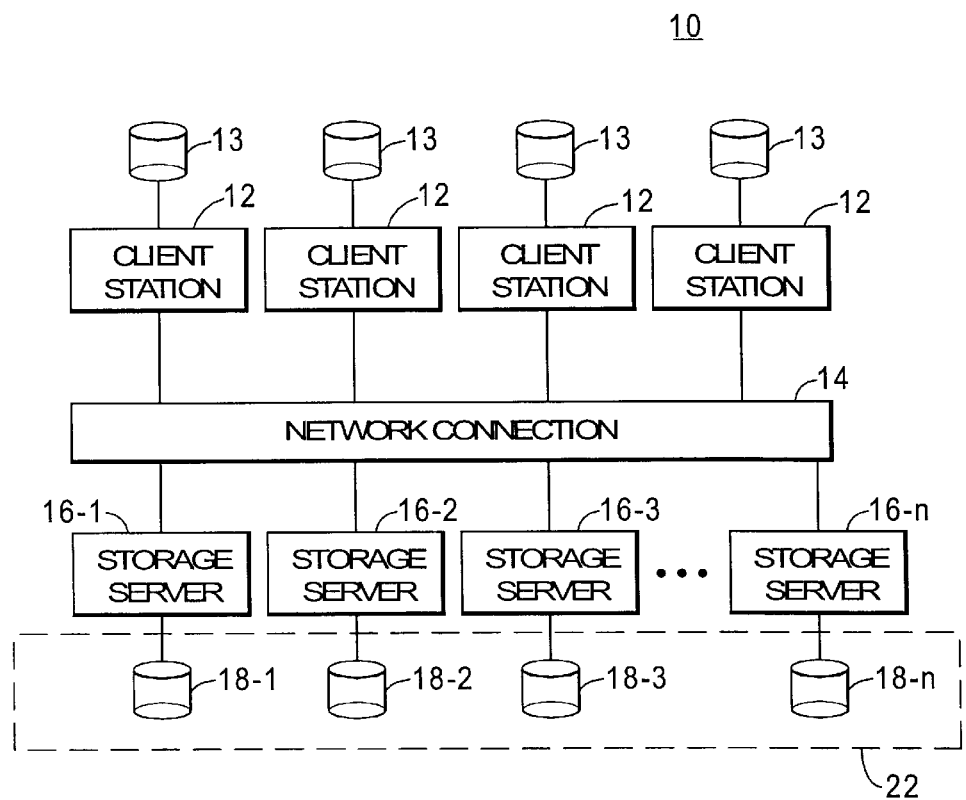
FIG. 2 illustrates the computer network shown in FIG. 1 having a virtual disk in accordance with the present invention.

FIG. 2 illustrates the computer network 10 with a logical, virtual disk 22. The virtual disk 22 contains identifiers, typically the actual software files, or identifiers such as storage disk addresses or some other representation of configuration information stored on at least selected ones of the storage disks 18-1 through 18-n. The identifiers stored in the virtual disk 22 are accessible by the client stations 12 by way of the network connections 14.

Figure 6:
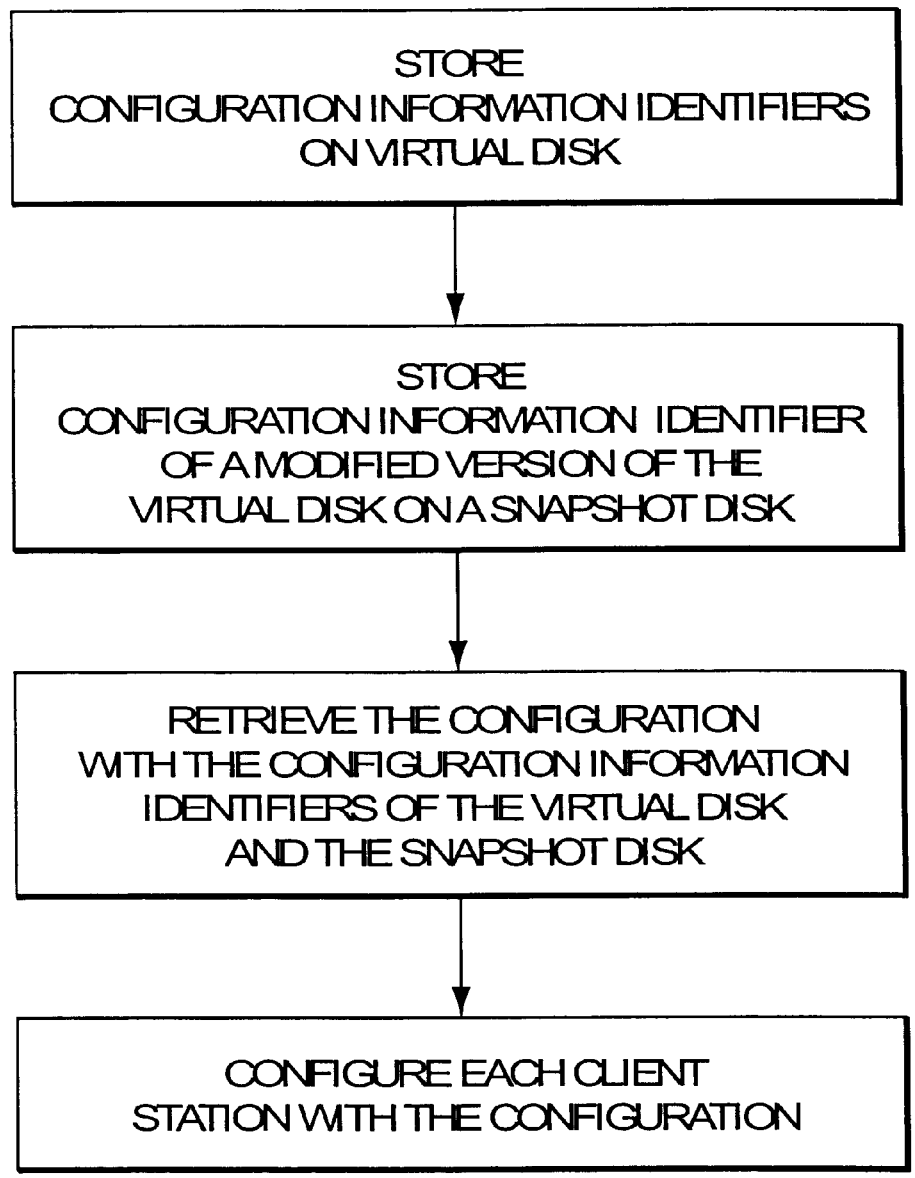
FIG. 6 is a flowchart illustrating the method for configuring network client stations in accordance with the present invention.

The virtual disk 22 contains configuration information identifiers that can be used to configure client stations 12 according to the flowchart shown in FIG. 6. Hence, virtual disk 22 forms a logical, master configuration disk, the contents of which are accessible by any of the client stations 12 to configure such client stations.

The configuration information stored on the storage disks 18 may include, for instance, the operating system software for the client stations 12 as well as application software and/or data bases.

Figure 3:
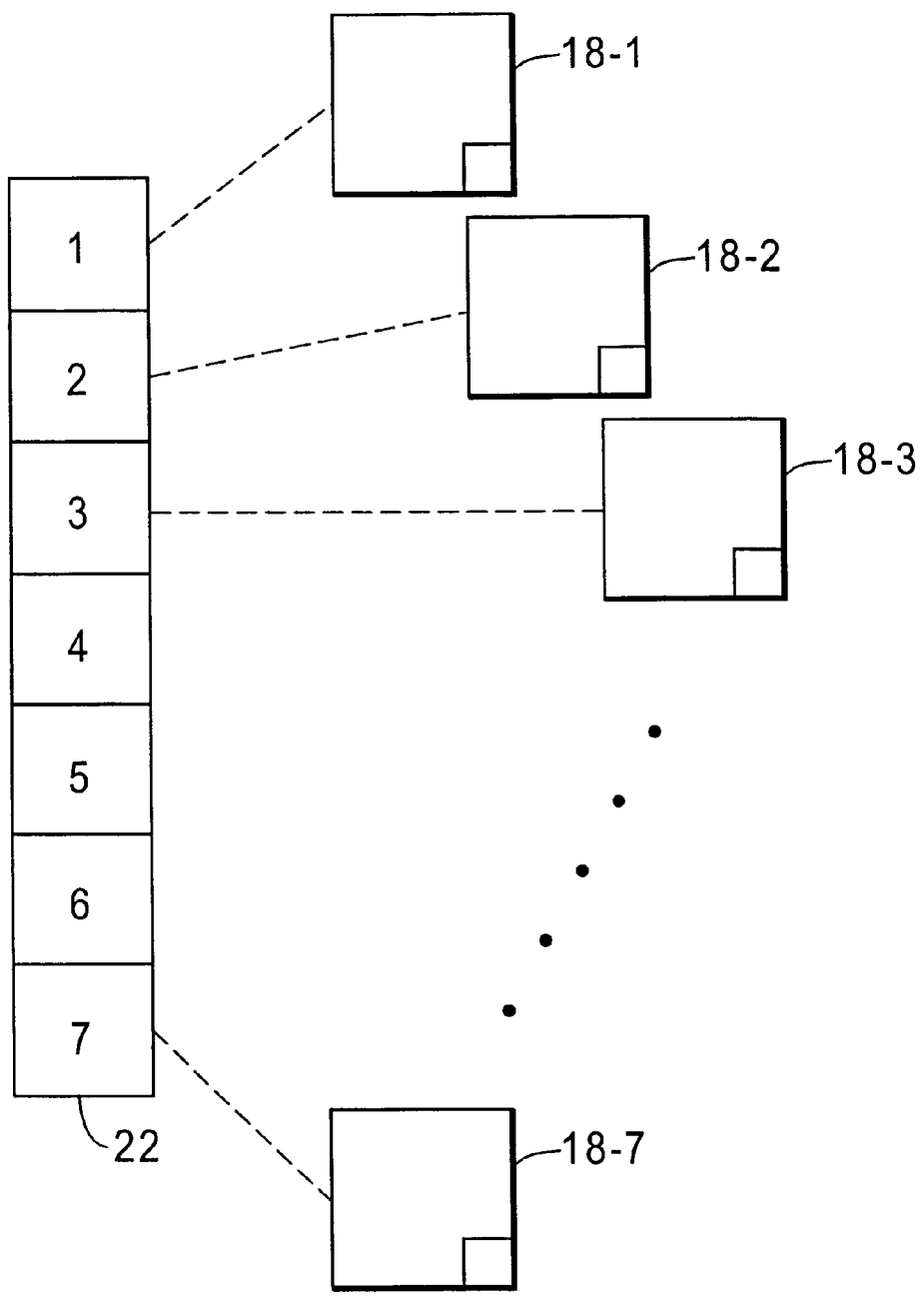
FIG. 3 illustrates the relationship between a virtual disk and physical storage devices at which configuration information is stored in accordance with the present invention.

FIG. 3 illustrates the relationship between the virtual disk 22, shown in FIG. 2, and the physical, storage disks 18, shown in FIG. 1. The virtual disk 22 is here shown to be formed of a plurality of consecutively-numbered configuration information identifier files 1–7. The files 1–7 include the configuration information identifiers for one or more of the client stations as well as information mapping back to physical storage locations at individual ones of the storage disks 18 which actually store the operating system software or other configuration information. A one-to-one relationship between the configuration identifier files 1–7 and the respective physical storage locations of the associated software is shown. However, two or more files 1–7 might instead be associated with software actually stored at a single storage disk 18 or portions of a single file 1–7 might be associated with software distributed across two or more storage disks 18.

Figure 4:
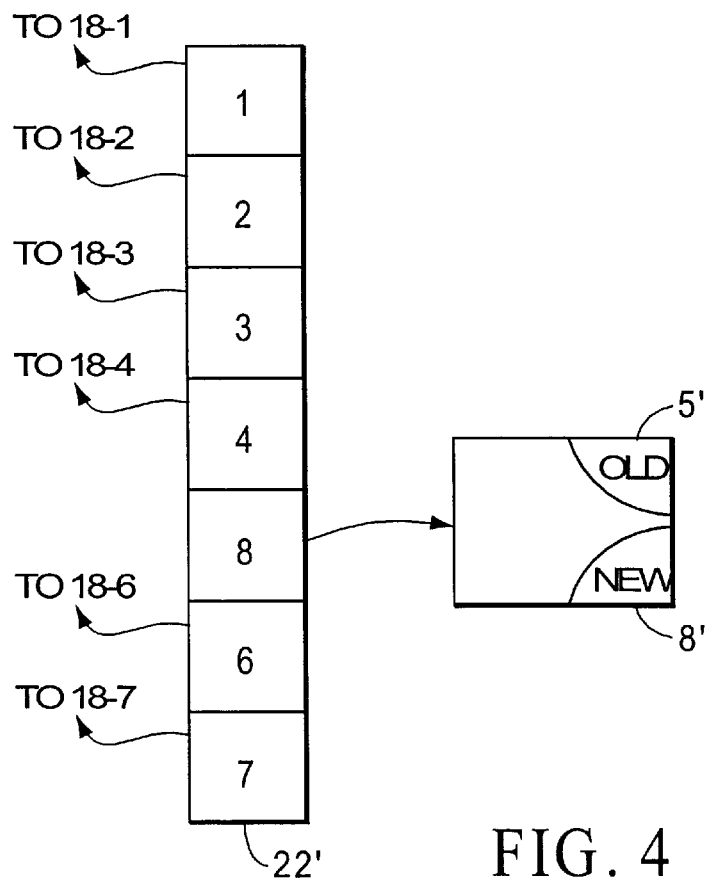
FIG. 4 illustrates a modified version of the virtual disk shown in FIG. 3.

The virtual disk 22 can be replicated to form a copy of the virtual disk 22. FIG. 4 illustrates a second virtual disk 22', here containing a plurality of files 1–4 and 6–8. The files 1–4 and 6–7 are identical to the corresponding files 1–4 and 6–7 of the virtual disk 22. The file number 8 is a modified version of file 5, here including the functional upgrades at the right-side of FIG. 4. Hence, file 8 is shown to have both "old" identifier information 5' and "new" identifier information 8'.

Figure 5:
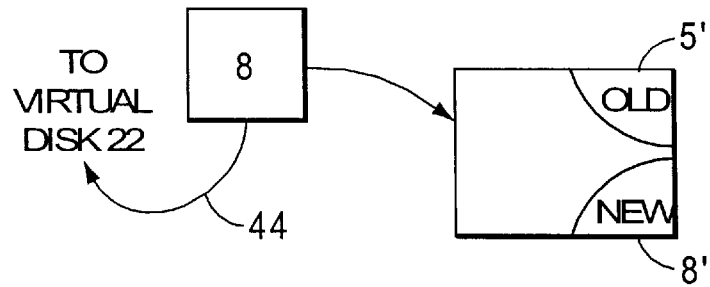
FIG. 5 illustrates a snapshot which includes a pointer mapping back to a modified portion of the virtual disk shown in FIG. 3.

Because configuration identifier files 1–4 and 6–7 of the second virtual disk 22', are identical to the identically numbered configuration identifier files of the virtual disk 22, these files need not, in fact, be copied from the files of the disk 22. Rather, the second virtual disk 22' need only include a new logical copy of file 8. The logical copy of file 8 is referred to as a "snapshot" of the second virtual disk 22' and is represented in FIG. 5.

Snapshots of the virtual configuration identifier disk 22' are created to form virtual snapshot disks. The virtual snapshot disks are exported to the appropriate client station(s) 12.

Here, the snapshot disk includes a pointer 44 which points back to the virtual disk 22. The pointer 44 includes mapping information to permit mapping back to the virtual disk 22 and, in turn, back to the physical locations at which actual configuration information is physically stored on mass storage elements 18. File 5 is not included in the snapshot; rather, the snapshot permits mapping to the modified file 8. Hence, the forming of files in the snapshot can be performed using a copy-on-write technique in which the snapshot need only include those configuration file identifiers within virtual disk 22' which are different than the configuration identifier files in virtual disk 22.

The snapshot disks are mapped to the master configuration identifier files on virtual disk 22. The snapshot disks are exported to client stations which are to be configured using the snapshot, and the client stations are configured accordingly. Pointers contained in the snapshot.disks permit configuration information, as appropriate, to be retrieved from the servers 16 and installed in the local memories 13 of the client stations 12.

Other versions of a master configuration identifiers stored on virtual disk 22 can also be created such that any number of different versions of the master configuration identifiers are stored on any number of virtual disks 22' using snapshots. These different versions can be selectively exported to different ones of the client stations. For example, the network administrator of the computer network 10 may configure a particular client station with a selected one of several versions of the master configuration using identifiers on virtual disks 22'. Since a number of the files on the different versions of a master configuration identifiers stored on virtual disks 22' might be similar, the need to separately, physically store common configuration identifier files within different virtual disks is eliminated. In a snapshot disk, merely a pointer, such as the pointer 44 shown in FIG. 5, is required.

Information stored at the local memories 13 of the client stations 12 can similarly be copied in an expeditious manner by forming snapshots of such information. The snapshots can be stored at a remote location, such as at the storage server 16 of the network 10. In the event of failure of one of the client stations 12, the backup snapshot disks can be retrieved from the storage server 16 to permit recovery of the client station.

The previous descriptions are of preferred examples for implementing the invention, and the scope of the invention should not necessarily be limited by this description. The scope of the present invention is defined by the following claims.

What is claimed is:

1. A system for configuring and updating networked client stations, comprising:

a plurality of client stations connected to a network;

a storage device connected to the plurality of client stations via the network and storing configuration information, wherein each of the plurality of client stations is configurable with the configuration information;

a virtual disk containing configuration information identifiers each including a representation of the configuration information and mapping information pointing to the storage device location where the configuration information is stored, wherein the configuration information is retrievable from the storage device by the plurality of client stations with the configuration information identifiers in the virtual disk; and a snapshot disk created for a modified version of the virtual disk, the snapshot disk containing at least one configuration information identifier that is different than the configuration information identifiers in the virtual disk, wherein the snapshot disk is exportable to any one of the plurality of client stations and the configuration information is retrievable with the configuration information identifiers in the snapshot disk.

2. The system of claim 1, wherein the snapshot disk is formed by a copy-on-write technique.

3. The system of claim 1, wherein each of the plurality of client stations includes a local storage device configured to store the configuration information.

4. The system of claim 1, wherein the virtual disk is formed of a plurality of identifier files each including configuration information identifiers related to the configuration information for one or more of the plurality of client stations.

5. The system of claim 4, wherein the identifier files are consecutively-numbered.

6. The system of claim 4, wherein a one-to-one relationship exists between the identifier files and the configuration information location in the storage device.

7. The system of claim 4, wherein the storage device is distributed on a plurality of storage servers, and wherein two or more of the identifier files are associated with the configuration information stored on a single storage server.

8. The system of claim 1, wherein the storage device is distributed on a plurality of servers, and wherein the network is scalable.

9. A method for configuring networked client stations with configuration information stored on one or more storage devices, the client stations being connected by network connections with the one or more storage devices, the method comprising the steps of:

storing configuration information identifiers in a virtual disk, each of the configuration information identifiers including a representation of the configuration information and mapping information pointing to one or more storage devices locations, wherein each of the plurality of client stations is configurable with the configuration information;

storing a configuration information identifier in a snapshot disk that indicates a modified version of the virtual disk, the snapshot disk containing at least one configuration information identifier that is different than the configuration information identifiers in the virtual disk;

retrieving the configuration from the one or more storage devices with one or more of the configuration information identifiers in the virtual disk and the snapshot disk; and configuring each client station with the configuration information.

10. The method of claim 9, further comprising the step of:

storing an identifier that indicates a locations of a master configuration information;

wherein a snapshot includes a pointer mapped to the identifier of the configuration information of the master configuration information.

11. The method of claim 9, wherein there is more than one virtual disk each associated with configuration information, the method further comprising the steps of:

retrieving by first and second of the plurality of client stations configuration information from corresponding ones of the virtual disks with the configuration information identifiers therein; and configuring the first and second client stations with the configuration information.

12. The method of claim 11, further comprising the steps of:

selecting by a third client station a virtual disk from among the virtual disks;

retrieving by the third client station the configuration information with the configuration information identifiers in the selected virtual disk; and configuring the third client station with the configuration information.

13. The method of claim 9, wherein the virtual disk is formed by a copy-on-write technique.

14. A system for configuring and updating the configuration of networked client stations, comprising:

one or more storage devices including respective configuration information for configuring client stations connected via a network to each other and to the one or more storage disk devices, wherein each of the client stations is configurable with respective configuration information;

one or more virtual disks respectively containing configuration information identifiers each including a representation of respective configuration information and mapping information pointing to corresponding one or more of the locations in the storage devices where the respective configuration information is stored; and, a logical copy of each of the one or more virtual disks from which a second virtual disk is respectively created for updating the configuration of any of the client stations;

wherein each of the client stations obtains respective configuration information with the one or more virtual disks and the configuration information identifiers therein, and each client station obtains an updated version of the configuration information with the second virtual disk.

15. The system of claim 14 in which a particular configuration information identifier stored in the one or more virtual disks corresponds to a location of the respective configuration information characterized as a master configuration information, and the logical copy corresponds to a location of an updated version of the master configuration information.

16. The system of claim 14 in which each second virtual disk is a snapshot that embodies only modifications to the location from a corresponding virtual disk of the one or more virtual disks, wherein the identifier, respectively, in the one or more virtual disks is unchanged.

17. The system of claim 14, in which more than one of the client stations have respective configuration information obtained from one virtual disk.

18. The system of claim 14 in which the one or more virtual disks are formed of a plurality of identifier files, each of the identifier files including identifiers related to the configuration information for one or more of the plurality of client stations, wherein two or more of the identifier files include mapping into storage device.

19. The system of claim 14 in which the one or more virtual disks are formed of a plurality of configuration information identifier files, wherein only configuration information identifier files that are modified are embodied in their respective second virtual disks.

20. The system of claim 14 in which each second virtual disk includes a pointer to its respective virtual disk.

21. The system of claim 4 wherein the storage device is distributed on a plurality of storage servers and a single identifier file is associated with the appropriate configuration information stored on at least two of the storage servers.

22. The system of claim 14 in which the one or more virtual disks are formed of a plurality of identifier files, each of the identifier files including identifiers related to the configuration information for at least one of the plurality of client stations and wherein one identifier file includes mapping to at least one of the storage devices.

* * * * *